United States Patent
Jung (10) Patent No.: US 10,205,331 B2
(45) Date of Patent: Feb. 12, 2019

(54) BATTERY PACK

(71) Applicant: Samsung SDI Co., Ltd., Yongin-si, Gyeonggi-do (KR)

(72) Inventor: Heesung Jung, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 107 days.

(21) Appl. No.: 15/139,242

(22) Filed: Apr. 26, 2016

(65) Prior Publication Data

US 2016/0322838 A1 Nov. 3, 2016

(30) Foreign Application Priority Data

Apr. 29, 2015 (KR) .................. 10-2015-0060714

(51) Int. Cl.
| | |
|---|---|
| *H02J 7/00* | (2006.01) |
| *H01M 10/46* | (2006.01) |
| *H01M 2/10* | (2006.01) |
| *H01M 2/20* | (2006.01) |
| *H01M 10/42* | (2006.01) |

(52) U.S. Cl.
CPC ......... *H02J 7/0045* (2013.01); *H01M 2/1077* (2013.01); *H01M 2/206* (2013.01); *H01M 10/4257* (2013.01); *H01M 10/46* (2013.01); *H01M 2010/4271* (2013.01); *H01M 2220/20* (2013.01)

(58) Field of Classification Search
CPC . H02J 7/0045; H01M 2/1077; H01M 10/4257

USPC .................. 320/112, 116–122, 134, 136
See application file for complete search history.

(56) References Cited

U.S. PATENT DOCUMENTS

| | | | | |
|---|---|---|---|---|
| 2004/0212342 | A1* | 10/2004 | Batson | H02J 7/0047 320/107 |
| 2006/0028172 | A1* | 2/2006 | Vaillancourt | G01R 31/3655 320/110 |
| 2008/0284375 | A1* | 11/2008 | Nagaoka | B60L 11/1855 320/116 |
| 2011/0135970 | A1 | 6/2011 | Han et al. | |
| 2013/0177794 | A1 | 7/2013 | Shim | |
| 2013/0202935 | A1 | 8/2013 | Hwang et al. | |
| 2014/0120407 | A1* | 5/2014 | Hofer | H01M 2/206 429/159 |
| 2015/0072206 | A1* | 3/2015 | Houchin-Miller | B60R 16/03 429/120 |

FOREIGN PATENT DOCUMENTS

| | | |
|---|---|---|
| JP | 11-297287 A | 10/1999 |
| KR | 10-2011-0062384 A | 6/2011 |
| KR | 10-2013-0080639 A | 7/2013 |
| KR | 10-2013-0090096 A | 8/2013 |

* cited by examiner

*Primary Examiner* — Zixuan Zhou
(74) *Attorney, Agent, or Firm* — Knobbe Martens Olson & Bear LLP (57) ABSTRACT

A battery pack is disclosed. In one aspect, the battery pack includes a plurality of battery cells each extending in a first direction and a battery management system (BMS) configured to control a charging/discharging operation of the battery cells. The BMS is placed at one of exterior surfaces of the battery cells and extends in a direction crossing the first direction.

21 Claims, 6 Drawing Sheets

BATTERY PACK

CROSS-REFERENCE TO RELATED APPLICATION

This application claims the benefit of Korean Patent Application No. 10-2015-0060714, filed on Apr. 29, 2015, in the Korean Intellectual Property Office, the disclosure of which is incorporated herein in its entirety by reference.

BACKGROUND

Field

The described technology generally relates to battery packs.

Description of the Related Technology

Secondary batteries (or rechargeable batteries), unlike primary batteries, can be charged and recharged multiple times. They are used as energy sources for many commercial applications such as mobile devices, electric vehicles, hybrid vehicles, and electric bicycles, or as uninterruptible power supplies. According to the types of devices that operate based on such batteries, secondary batteries can be configured as a battery cell or a pack including multiple battery cells electrically connected to one another packaged into one unit.

Small mobile devices, such as mobile phones, can operate according to the output and capacity of one battery for a predetermined period of use. However, for electric and hybrid vehicles with much power consumption and hybrid vehicles, a module including a number of batteries is necessary due to higher required power and capacity. For those applications, output voltage or output current are increased according to the number of batteries built in a device.

SUMMARY OF CERTAIN INVENTIVE ASPECTS

One inventive aspect relates to a battery pack in which a length of a lead wire connecting a plurality of batteries and a battery management system is reduced.

Another aspect is a battery pack in which length unbalance of the lead wire that extends from the batteries is reduced so that a measurement error using the lead wire is reduced.

Another aspect is s battery pack that may avoid erroneous polarity connection by providing misassembly prevention mechanism.

Another aspect is a battery pack that includes: a plurality of battery cells in which electrodes are disposed in a direction parallel to a first axis; and a battery management system controlling a charging/discharging operation of the battery cells, disposed on one of outward facing surfaces of the battery cells in a direction parallel to a second axis different from the first axis.

Some of the plurality of battery cells may be accommodated in a cell holder to form a battery assembly, and a plurality of the battery assemblies may be arranged in a case in a direction parallel to a third axis.

The third axis may be different from the first axis and the second axis.

The battery assemblies may be electrically connected to one another via bus bars disposed in a direction parallel to the first axis.

The battery management system may extend in a direction parallel to the third axis.

The battery management system may be electrically connected to different battery assemblies which are among the battery assemblies and arranged in a direction parallel to the third axis.

The battery management system may include a circuit board and a plurality of circuit elements mounted on the circuit board, and long side parts of the circuit board may extend in a direction parallel to the third axis.

The battery management system may be disposed outside of the case.

The cell holder and the case may be assembled in a direction parallel to the second axis.

A misassembly prevention mechanism may be formed when the cell holder and the case face each other.

The misassembly prevention mechanism may include first and second coupling parts which match each other when the cell holder and the case face each other.

One side of the first and second coupling parts may be convex shaped and may protrude in a direction parallel to the second axis, and the other side of the first and second coupling parts may be concave shaped and may be recessed in a direction parallel to the second axis.

The first coupling parts may be formed on both of outward facing surfaces of the cell holder in a direction parallel to the second axis, and the second coupling parts may be formed on both of outward facing surfaces of the case.

The first and second coupling parts may be formed on either front or rear side with respect to a direction parallel to the first axis.

Bus bars may be disposed in a direction parallel to the first axis so as to electrically connect different battery assemblies which are among the battery assemblies, wherein the different battery assemblies electrically connected by the bus bars may be connected in parallel and may have the same polarity or may be connected in series and have different polarities.

Another aspect is a battery pack comprising: a plurality of battery cells each extending in a first direction; and a battery management system (BMS) configured to control a charging/discharging operation of the battery cells, wherein the BMS is placed on an exterior surface of the battery cells and extends in a direction crossing the first direction.

The above battery pack further comprises: a plurality of cell holders each accommodating some of the battery cells to form a battery assembly; and a case accommodating the battery assemblies and extending in a third direction. In the above battery pack, the third direction is different from the first and second directions. In the above battery pack, the battery assemblies are electrically connected to one another via a plurality of bus bars that extend in the first direction. In the above battery pack, the BMS extends in the third direction. In the above battery pack, the BMS is electrically connected to different ones of the battery assemblies.

In the above battery pack, the BMS comprises a circuit board and a plurality of circuit elements mounted on the circuit board, and wherein long side parts of the circuit board extend in the third direction. In the above battery pack, the BMS is placed on an outer surface of the case. In the above battery pack, the case and each of the cell holders extend in the second direction. The above battery pack further comprises a coupler configured to prevent misassembly between the cell holders and the case.

In the above battery pack, the coupler comprises first and second couplers configured to match each other when the cell holders and the case face each other. In the above battery pack, one of the first and second couplers includes a first side that is convex shaped and protrudes in the second direction, and wherein the other of the first and second couplers includes a second side that is concave shaped and is recessed in the second direction so as to be connected to the first side. In the above battery pack, the first coupler is placed on exterior surfaces of at least one of the cell holders and extends in the second direction, and wherein the second coupler is placed on exterior surfaces of the case. In the above battery pack, the first and second couplers are placed on either front or rear side with respect to the first direction. The above battery pack further comprises a plurality of bus bars extending in the first direction so as to electrically connect different ones of the battery assemblies, wherein the different battery assemblies electrically connected by the bus bars are connected in parallel and have the same polarity or are connected in series and have different polarities.

Another aspect is a battery pack comprising: a case accommodating a plurality of battery assemblies which extend in a first direction; and a battery management system (BMS) configured to control a charging/discharging operation of the battery cells, wherein the BMS is placed on an exterior surface of the case and extend in the first direction.

In the above battery pack, each of the battery assemblies comprises a plurality of battery cells each extending in a second direction crossing the first direction. In the above battery pack, the first and second directions are substantially perpendicular to each other. In the above battery pack, the BMS has a substantially rectangular shape having a pair of long sides and a pair of short sides, and wherein the long sides of the BMS extend in the first direction. The above battery pack further comprises a plurality of bus bars connecting the battery assemblies and extending in the first direction.

BRIEF DESCRIPTION OF THE DRAWINGS

These and/or other aspects will become apparent and more readily appreciated from the following description of the exemplary embodiments, taken in conjunction with the accompanying drawings.

DETAILED DESCRIPTION OF CERTAIN INVENTIVE EMBODIMENTS

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. In this disclosure, the term "substantially" includes the meanings of completely, almost completely or to any significant degree under some applications and in accordance with those skilled in the art. Moreover, "formed on" can also mean "formed over." The term "connected" includes an electrical connection.

Hereinafter, a battery pack according to an exemplary embodiment will be described with reference to the attached drawings.

Figure 1:
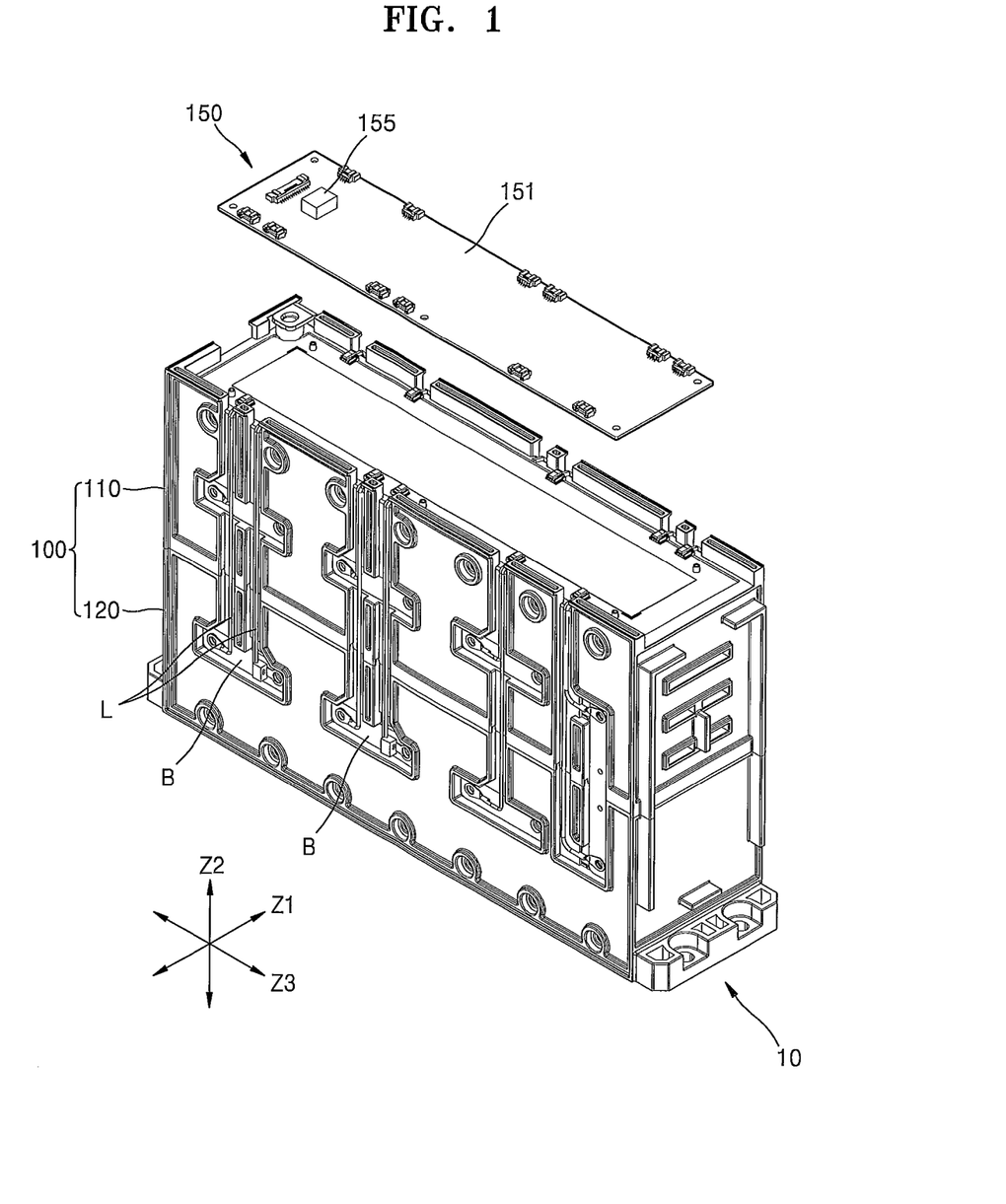
FIG. 1 is a perspective view of a battery pack according to an exemplary embodiment.
Figure 2:
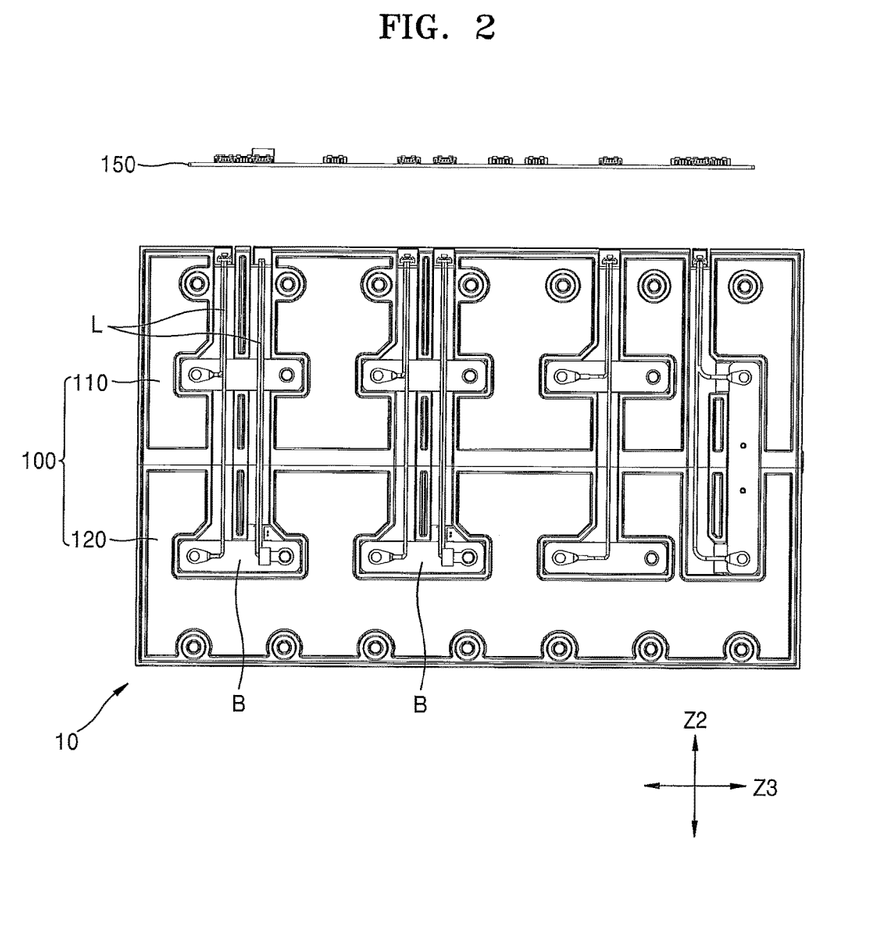
FIG. 2 is a view of a side structure of the battery pack illustrated in FIG. 1.
Figure 3:
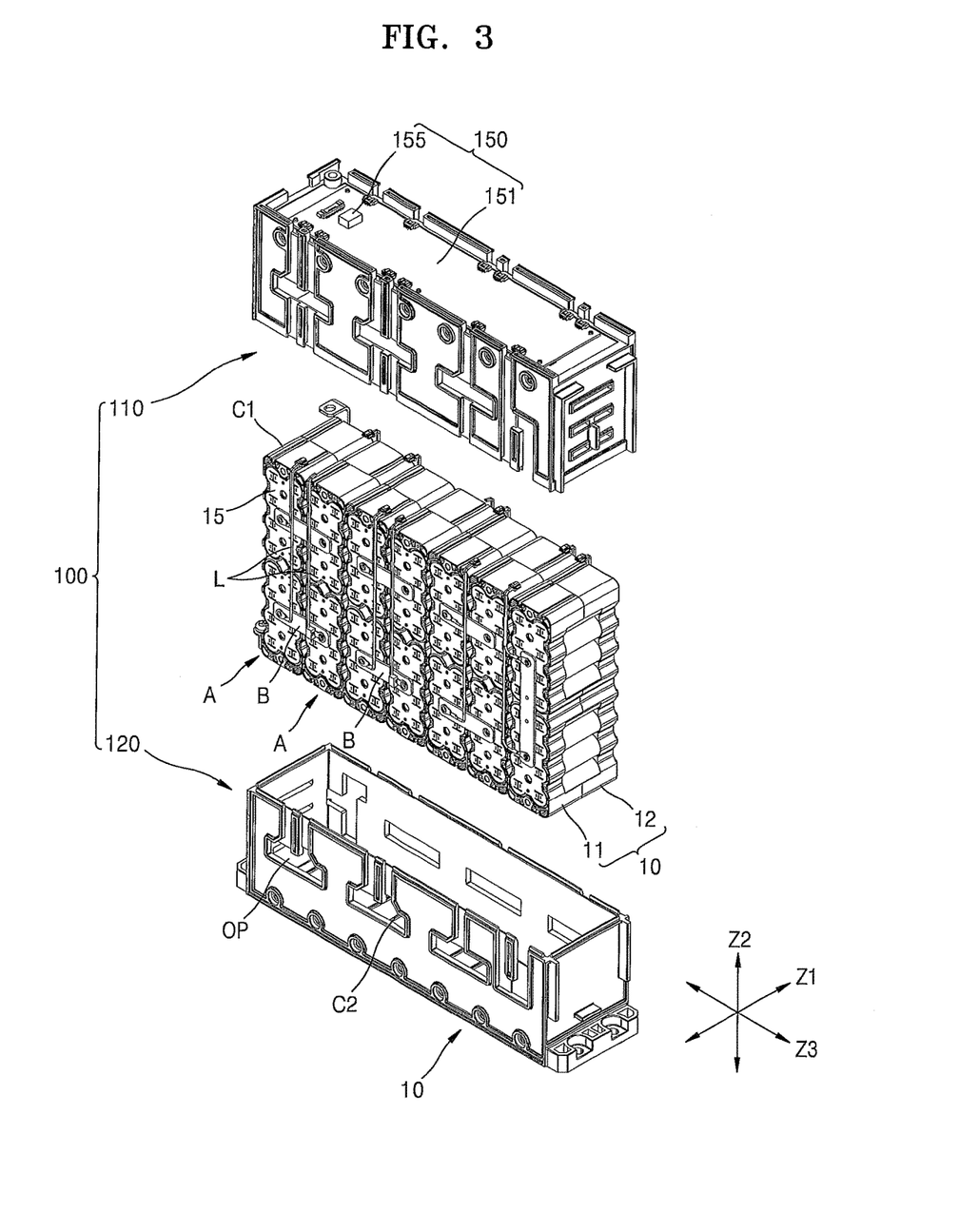
FIG. 3 is an exploded perspective view of the battery pack of FIG. 1.
Figure 4:
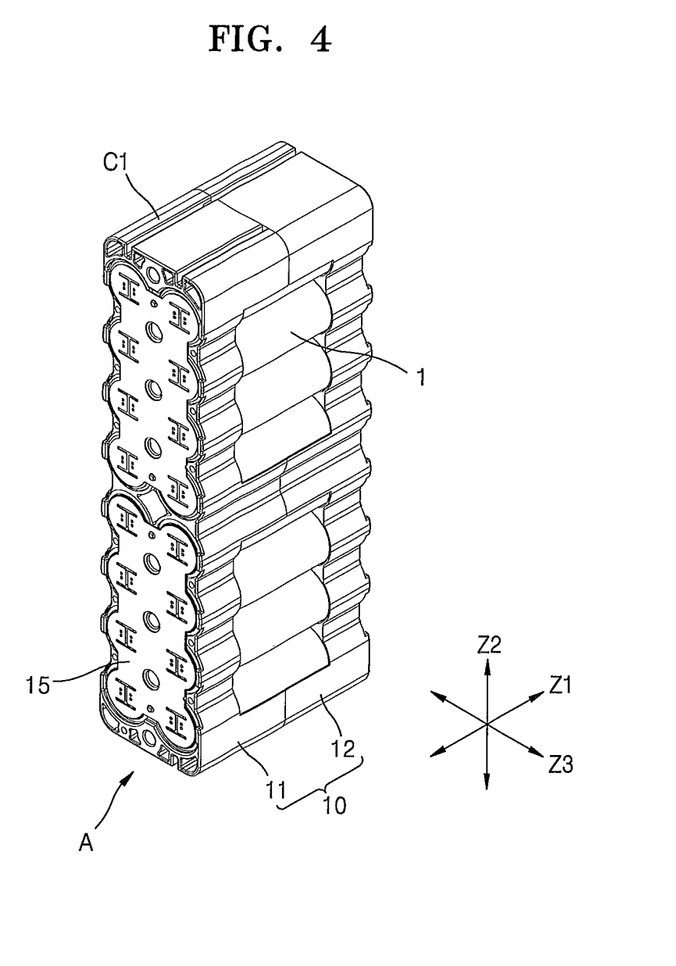
FIG. 4 is a perspective view of a battery assembly illustrated in FIG. 3.

FIG. 1 is a perspective view of a battery pack 10 according to an exemplary embodiment. FIG. 2 is a view of a side structure of the battery pack 10 illustrated in FIG. 1. FIG. 3 is an exploded perspective view of the battery pack 10 of FIG. 1. FIG. 4 is a perspective view of a battery assembly illustrated in FIG. 3.

Referring to FIGS. 1 through 3, the battery pack 10 includes a plurality of battery assemblies A and a case 100 in which the battery assemblies A are accommodated. The battery pack 10 includes a battery management system (BMS) 150 that controls a charging/discharging operation of a plurality of battery cells 1 (see FIG. 4).

Referring to FIG. 4, each of the battery assemblies A includes the battery cells 1 in which electrodes are formed in a direction parallel to a first axis Z1, and a lead plate 15 that connects the electrodes of the battery cells 1. The lead plate 15 may electrically connect the battery cells 1 and may form a path of a charging/discharging current. Instead of a single lead plate 15, a pair of lead plates 15 may be disposed on both sides of the battery cells 1 in a direction parallel to the first axis Z1 and connected to the electrodes formed on both ends of the battery cells 1 in a direction parallel to the first axis Z1. For example, the pair of lead plates 15 may be disposed on both sides of the battery cells 1 in a direction parallel to the first axis Z1 and may be connected to electrodes having different polarities.

Each battery assembly A may include a cell holder 10 that accommodates the battery cells 1. The battery cells 1 inserted into the cell holder 10 may be electrically connected to the lead plate 15 through both ends exposed from the cell holder 10. In some embodiments, the cell holder 10 includes first and second cell holders 11 and 12 that are assembled to face each other in the direction parallel to the first axis Z1 in a state in which the battery cells 1 are interposed between the first and second cell holders 11 and 12. Each of the first and second cell holders 11 and 12 may include an assembly rib (not shown) that regulates an assembly position of each of the battery cells 1 so as to align the battery cells 1 in a regular assembly position. Although not shown, the assembly rib (not shown) may be formed to surround a cylindrical outer circumferential surface of each battery cell 1. The cell holder 10 may form an exterior of the battery assembly A.

In some embodiments, as will be described below, a first coupling part or first coupler C1 is formed in the cell holder 10. The first coupling part C1 may be formed on both sides of the cell holder 10 in a direction parallel to the second axis Z2. The first coupling part C1 may match a second coupling part or second coupler C2 and may be coupled to the second coupling part C2 formed in the case 100, and misassembly between the cell holder 10, i.e., between the battery assembly A and the case 100 through the first and second coupling parts C1 and C2 which match each other may be prevented. A misassembly prevention mechanism between the battery assembly A and the case 100 will be described later in more detail.

As illustrated in FIG. 3, two or more battery assemblies A, are provided. The battery assemblies A may be electrically connected to each other or may be electrically connected to each other in a series, parallel, or series-parallel mixed shape. In connection of the battery assemblies A, the lead plates 15 of adjacent battery assemblies A may be connected to each other using a bus bar B so that the adjacent battery assemblies A may be electrically connected to each other.

The lead plates 15 having opposite polarities may be electrically connected to each other between the battery assemblies A disposed to be adjacent to each other, so that the adjacent battery assemblies A may be connected to each other in series. In another embodiment, the lead plates 15 having the same polarity are electrically connected to each other between the battery assemblies A disposed to be adjacent to each other so that the adjacent battery assemblies A may be connected to each other in parallel.

The bus bar B may be disposed in alternate pattern in the direction parallel to the first axis Z1 so as to electrically connect the lead plates 15 arranged on both sides of the battery cells 1 in the direction parallel to the first axis Z1, and the battery assemblies A may be connected to each other in series according to alternate arrangement of the bus bar B in this way.

The bus bar B may include a plurality of bus bars B that connect a pair of battery assemblies B disposed to be adjacent to each other. Each of the bus bars B may electrically connect different pairs of battery assemblies A. A lead wire L may be connected to the bus bar B. The lead wire L provides an electrical connection between the bus bar B and the battery management system 150 and may serve to transmit status information, such as voltage or temperature measured by the bus bar B, to the battery management system 150.

The battery assemblies A may be accommodated in the case 100. In some embodiments, the case 100 includes first and second cases 110 and 120 assembled in opposite directions by interposing the battery assembly A between the first and second cases 110 and 120. The first and second cases 110 and 120 may be assembled in the direction parallel to the second axis Z2 perpendicular to the direction parallel to the first axis Z1 in which the battery cells 1 are arranged. The first and second cases 110 and 120 may be assembled in the direction parallel to the second axis Z2 in a state in which the battery assemblies A are interposed between the first and second cases 110 and 120. The first and second cases 110 and 120 may accommodate the battery assemblies A and may accommodate the bus bars B that electrically connect the battery assemblies A to each other using openings OP formed in sides of the first and second cases 110 and 120.

The battery management system 150 may be disposed on one of outward facing surfaces of the battery assembly A in the direction parallel to the second axis Z2. The battery management system 150 can be used to control a charging/discharging operation of each battery assembly A. For example, the battery management system 150 collects the status information of the battery assembly A and controls the charging/discharging operation of the battery assembly A based on the collected status information. Furthermore, the battery management system 150 may obtain voltage information of each of the battery assemblies A through each of the lead wires L that extends from each bus bar B connected to each battery assembly A, i.e., electrically connected to each battery assembly A.

The battery management system 150 may obtain temperature information of the battery assembly A through each lead wire L that extends from each bus bar B connected to each battery assembly A, i.e., thermally connected to each battery assembly A. The battery management system 150 may capture malfunction, such as overcharging, overdischarging, or overheating of each battery assembly A based on the status information regarding a voltage or temperature of each battery assembly A. Thus, the battery management system 150 may perform a safety operation like stopping charging/discharging of each battery assembly A.

The battery management system 150 is electrically connected to the battery assembly A through the lead wire L and is disposed adjacent to the battery assembly A so as to reduce a length of the lead wire L. For example, the battery management system 150 may be disposed on one of outward facing surfaces of the battery assembly A in the direction parallel to the second axis Z2 perpendicular to the direction parallel to the first axis Z1. In some embodiments, when the battery cells 1 are arranged in the direction parallel to the first axis Z1, the battery management system 150 may be disposed on an upper portion of the battery assembly A.

The battery management system 150 may be disposed on the upper portion of the battery assembly A and may form an electrical contact point with the lead wire L that extends from the battery assemblies A. For example, the battery management system 150 may extend in a direction parallel to a third axis Z3 and may be electrically connected to the battery assemblies A arranged in the direction parallel to the third axis Z3. In this case, lengths of the lead wires L between the battery management system 150 and each battery assembly A may be slightly balanced and may be formed to be substantially the same, and length unbalance of the lead wires L according to a difference in positions of the battery assemblies A may be reduced. For example, the lead wires L transmit electrical signals regarding a voltage or temperature of each battery assembly A. Length unbalance of the lead wires L causes a measurement error caused by distribution of electrical resistances.

In some embodiments, the battery management system 150 is arranged in the direction parallel to the third axis Z3 in which the battery assemblies A are arranged, and connects at a shortest distance with each battery assembly A, and minimizes a measurement error caused by position distribution of the battery assembly A. The battery management system 150 may extend long in the direction parallel to the third axis Z3 different from the direction parallel to the first axis Z1 in which the battery cells 1 extend, and may form electrical connection with the battery assemblies A arranged in the direction parallel to the third axis Z3, and may reduce the length of each lead wire L.

In some embodiments, as shown in FIGS. 1 and 3, the battery management system 150 includes a circuit board 151 and a plurality of circuit elements 155 mounted on the circuit board 151. Arranging the battery management system 150 in a different direction from the direction parallel to the first axis Z1, i.e., in the direction parallel to the third axis Z3 perpendicular to the direction parallel to the first axis Z1 may mean that the circuit board 151 of the battery management system 150 is disposed in the direction parallel to the third axis Z3. For example, when the circuit board 151 of the battery management system 150 is formed to have an approximately rectangular shape including a pair of long side parts that extend relatively long and a pair of short side parts that extend relatively short, the long side parts of the circuit board 151 may extend in a direction parallel to a third axis Z3.

The battery management system 150 may be placed at an outside of the case 100. For example, the battery management system 150 may be placed on an upper portion of the first case 110. As described above, the battery management system 150 may be placed on one of outward facing surfaces of the battery assembly A in the direction parallel to the second axis Z2 different from the direction parallel to the first axis Z1 in which the battery cells 1 extend, i.e., in the direction parallel to the second axis Z2 perpendicular to the direction parallel to the first axis Z1.

In an embodiment, when the battery cells 1 extend in the direction parallel to the first axis Z1, the battery management system 150 may be placed on an upper portion of the battery assembly A. The battery management system 150 can be placed on the upper portion of the battery assembly A such that the battery management system 150 are substantially equidistant from the bus bars B placed on front and rear side of the battery assemblies A with respect to the direction parallel to the first axis Z1.

If the battery management system 150 is placed ahead or behind the battery assembly A (i.e., on one side of the front and the rear of the battery assembly A with respect to the direction parallel to the first axis Z1), a connection length of the lead wires L that extend from the bus bar B placed at an opposite side to the battery management system 150 may be increased accordingly, and lengths of the lead wires L between the bus bar B in an adjacent position and the bus bar B in an opposite position are unbalanced so that an error of measurement signals caused by a difference in resistances of the lead wires L may occur.

In some embodiments, when the battery cells 1 are arranged in the direction parallel to the first axis Z1, the battery management system 150 is placed on the upper portion of the battery assembly A so that a connection length from bus bars B connected to both ends of the battery cell 1 may be reduced and a difference caused by positions of the battery assemblies A may be removed and connection lengths of the battery assemblies A may be maintained at an equal level.

If the battery management system 150 is placed to the right or left of the battery assembly A (i.e., to one side of the right and left of the battery assembly A with respect to the direction parallel to the third axis Z3), lengths of connections between the battery management system 150 and the battery assemblies A arranged in the direction parallel to the third axis Z3 may differ, thus resulting in errors in signal measurements. For example, lengths of lead wires L connecting the battery management system 150 to battery assemblies A placed at a relatively long distance may be greater than those of lead wires L connecting the battery management system 150 to battery assemblies A placed at a relatively short distance.

In some embodiments, when the battery cells 1 are arranged in the direction parallel to the first axis Z1, the battery management system 150 is placed on the upper portion of the battery assembly A so that a connection length from the bus bars B connected to both ends of the battery cell 1 (that correspond to lengths of the lead wires L) may be reduced, a difference caused by positions of the battery assemblies A may be removed and connection lengths with the battery assemblies A may be maintained at an equal level.

The battery management system 150 may be placed in a different space from the battery assembly A, for example, outside of the case 100. The battery management system 150 may include heat-dissipation components, may be placed in a space separated from the battery assemblies A, and may promote heat dissipation.

Figure 5:
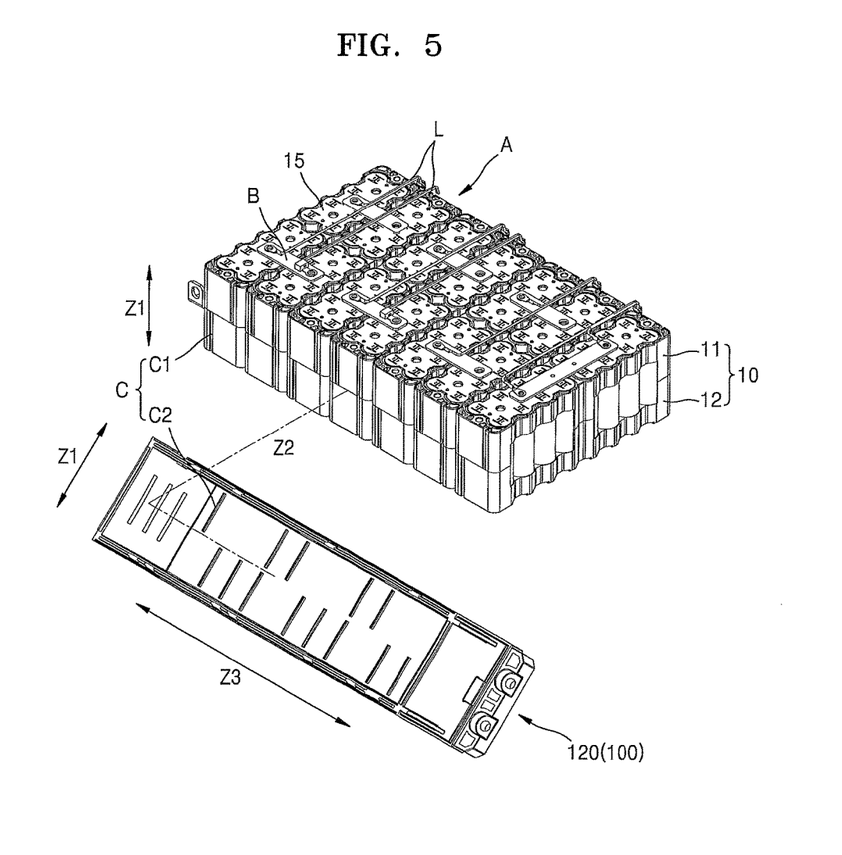
FIG. 5 is a perspective view of assembly between a battery assembly and a case, so as to explain a misassembly prevention mechanism between the battery assembly and the case according to an exemplary embodiment.
Figure 6:
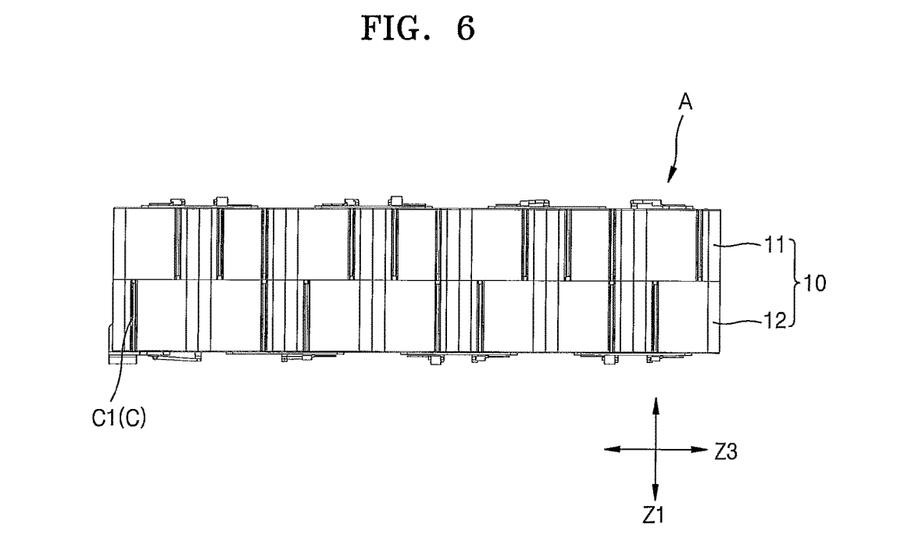
FIG. 6 is a plan view of a first coupling part of the battery assembly illustrated in FIG. 5.
Figure 7:
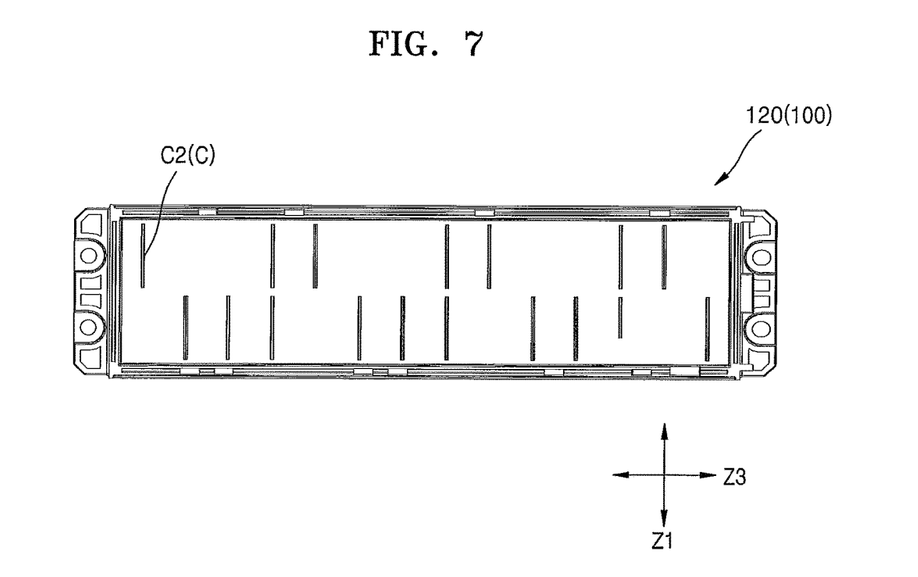
FIG. 7 is a plan view of a second coupling part of the case illustrated in FIG. 5.

FIGS. 5 through 7 are views for explaining a misassembly prevention mechanism between the battery assembly and the case according to an exemplary embodiment. FIG. 5 is a perspective view of assembly between a battery assembly and a case, so as to explain a misassembly prevention mechanism between the battery assembly and the case according to an exemplary embodiment, and FIGS. 6 and 7 are plan views of first and second coupling parts of the battery assembly and the case, respectively.

Referring to FIGS. 5 through 7, a coupler C configured to prevent misassembly is placed at one side of the battery assembly A. The coupler C may include a first coupling part C1 formed in the battery assembly A and a second coupling part C2 formed in the case 100 into which the battery assembly A is inserted.

The first and second coupling parts C1 and C2 may prevent misassemby between the battery assembly A and the case 100. For example, the first and second coupling parts C1 and C2 may prevent the front and the rear (with respect to a direction parallel to a first axis Z1) of the battery assembly A from being reversely assembled. Lead plates 15 having different polarities are coupled to both ends of the battery assembly A in the direction parallel to the first axis Z1. Thus, when the front and the rear of the battery assembly A are reversely assembled, an error occurs in polarity connection of the battery assembly A.

In some embodiments, the battery assemblies A form serial connection to different adjacent battery assemblies through the bus bars B. In this case, the battery assemblies A are alternately placed in the direction parallel to the first axis Z1 and thus, the battery assemblies A having opposite polarities are electrically connected to each other using the bus bars B placed on front and rear side of battery assemblies A with respect to the direction parallel to the first axis Z1. However, if the adjacent battery assemblies A are not alternately placed in the direction parallel to the first axis Z1, but, for example, the battery assemblies A having the same polarity extend in the forward and backward directions with respect to the direction parallel to the first axis Z1, serial connection using the bus bars B is not formed, and an error occurs in polarity connection.

In some embodiments, the first and second coupling parts C1 and C2 of matching patterns are formed so that an error in polarity connection between the battery assembly A and the case 100, i.e., an error may not occur in the direction parallel to the first axis Z1. Thus, for example, when the adjacent battery assemblies A are not alternately placed in the direction parallel to the first axis Z1 but are arranged in erroneous orientation, the first and second coupling parts C1 and C2 do not match each other but come off between the battery assembly A and the case 100 so that a worker may immediately catch that there is an error in orientation of the battery assembly A and a rework may be performed.

The first and second coupling parts C1 and C2 having matching shapes may be formed on both of outward facing surfaces of the battery assembly A and both of outward facing surfaces of the case 100 in a position in which the battery assembly A and the case 100 face each other, i.e., in the direction parallel to the second axis Z2, respectively. In this case, the first coupling part C1 is formed in the cell holder 10 of the battery assembly A and is formed on either front or rear side in the direction parallel to the first axis Z1. The second coupling part C2 is formed in the case 100 and is formed on either front or rear side in the direction parallel to the first axis Z1. In this way, the first and second coupling parts C1 and C2 are formed on either front or rear side in the direction parallel to the first axis Z1 so that outward facing surfaces of the battery assembly A and the case 100 are formed in an asymmetrical shape in the direction parallel to the first axis Z1.

For example, if the direction parallel to the first axis Z1 of the battery assembly A is right, the first and second coupling parts C1 and C2 formed in the direction parallel to the first axis Z1 are placed to face each other, form matching and dense coupling. In this case, outward facing surfaces of the battery assembly A and the case 100 are in close contact with each other and form elaborate coupling. If the direction parallel to the first axis Z1 of the battery assembly A is erroneous, the first and second coupling parts C1 and C2 formed in the direction parallel to the first axis Z1 are placed not to face each other and do not form coupling and thus, the outward facing surfaces of the battery assembly A and the case 100 come off with respect to each other. Thus, the worker may perform a rework for rightly correcting orientation of the battery assembly A by reversing the front and the rear of the battery assembly A, correcting right orientation and then inserting the front and the rear of the battery assembly A into the case 100.

As illustrated in FIG. 5, the second coupling parts C2 are formed on outward facing surfaces of the case 100, i.e., on a bottom surface of the second case 120. Although not shown, the second coupling parts C2 may also be formed on the top surface of the first case 110. For example, the battery assemblies A are inserted in the direction parallel to the third axis Z3 of the case 100, and the second coupling part C2 that matches the first coupling part C1 of the different battery assemblies A is formed in the direction parallel to the third axis Z3. The second coupling part C2 may be formed in an asymmetrical shape in the direction parallel to the first axis Z1 and may capture erroneous orientation in which the direction parallel to the first axis Z1 is reversed. That is, the case 100 has an asymmetrical shape in the direction parallel to the first axis Z1 so that there may be a change in a status of assembly with the battery assembly A according to arrangement in the direction parallel to the first axis Z1.

The first and second coupling parts C1 and C2 match each other. In an embodiment, the first and second coupling parts C1 and C2 may be formed so that one side thereof may be convex shaped and the other side thereof may be concave shaped so that the first and second coupling parts C1 and C2 may be engaged with each other. One side selected from the first and second coupling parts C1 and C2 may be convex shaped, and the other side selected from the first and second coupling parts C1 and C2 may be concave shaped in a range in which the first and second coupling parts C1 and C2 have a shape in which they match each other.

The first and second coupling parts C1 and C2 may be formed in a convex shape in which they protrude in a vertical direction (in a direction parallel to a second axis Z2) or in a concave shape in which they are recessed in the vertical direction. That is, the first and second coupling parts C1 and C2 are formed in an assembly direction (that corresponds to the direction parallel to the second axis Z2) between the battery assembly A and the case 100 so that, when the battery assembly A and the case 100 are assembled with each other, mutual coupling may be naturally formed.

The first and second coupling parts C1 and C2 can be formed in both of facing outward facing surfaces of the battery assembly A and the case 100, respectively. That is, the first coupling parts C1 may be formed on both of the outward facing surfaces of the battery assembly A, and the second coupling parts C2 may be formed on both of the outward facing surfaces of the case 100. However, the described technology is not limited thereto, and in a range in which the battery assembly A and the case 100 face each other, for example, the first coupling part C1 may be selectively formed on one of the outward facing surfaces of the battery assembly A, and the second coupling part C2 may be selectively formed on one of the outward facing surfaces of the case 100.

Also, in an embodiment, the coupler C is formed on both of outward facing surfaces in the assembly direction (that corresponds to the direction parallel to the second axis Z2) of the battery assembly A and the case 100. However, the described technology is not limited thereto. For example, in a range in which the battery assembly A and the case 100 face each other, for example, the first coupling part C1 may be formed on a side surface of the battery assembly A, and the second coupling part C2 may be formed on a side surface of the case 100.

According to at least one of the disclosed embodiments, lengths of lead wires that connect a plurality of batteries and a battery management system may be reduced, and length unbalance of the lead wires that extend from a plurality of batteries is reduced so that a measurement error using the lead wires may be reduced. Furthermore, erroneous polarity connection may be avoided using the misassembly prevention mechanism.

While the inventive technology has been described with reference to the figures, it will be understood by those of ordinary skill in the art that various changes in form and details may be made therein without departing from the spirit and scope as defined by the following claims.

What is claimed is:

1. A battery pack comprising:
   a plurality of battery cells each battery cell having a first side and a second side longer than the first side, each battery cell extending in a first direction in which the second side of the battery cell extends;
   a battery management system (BMS) having a first side and a second side longer than the first side, the BMS being configured to control a charging/discharging operation of the battery cells, wherein the BMS is placed on a single exterior surface of the battery cells and extends in a third direction, crossing the first direction, in which the second side of the BMS extends;
   a plurality of lead wires interconnecting the battery cells and the BMS; and
   a case accommodating the battery cells and having a plurality of openings that expose the lead wires to the environment, wherein the openings are formed on an exterior surface of the case,
   wherein the case comprises a first case and a second case configured to be assembled in a second direction crossing both the first and third directions,
   wherein the openings comprise a plurality of first openings formed in the first case and a plurality of second openings formed in the second case, and wherein the first and second openings are aligned in the second direction when the first and second cases are assembled.

2. The battery pack of claim 1, further comprising:
   a plurality of cell holders each accommodating some of the battery cells to form a battery assembly.

3. The battery pack of claim 2, wherein the third direction is different from the first and second directions.

4. The battery pack of claim 2, wherein the battery assemblies are electrically connected to one another via a plurality of bus bars that extend in the first direction.

5. The battery pack of claim 2, wherein the BMS extends in the third direction.

6. The battery pack of claim 5, wherein the BMS is electrically connected to different ones of the battery assemblies.

7. The battery pack of claim 5, wherein the BMS comprises a circuit board and a plurality of circuit elements mounted on the circuit board, and wherein long side parts of the circuit board extend in the third direction.

8. The battery pack of claim 2, wherein the BMS is placed on an outer surface of the case.

9. The battery pack of claim 2, wherein the case and each of the cell holders extend in the third direction.

10. The battery pack of claim 2, further comprising a coupler configured to prevent misassembly between the cell holders and the case.

11. The battery pack of claim 10, wherein the coupler comprises first and second couplers configured to match each other when the cell holders and the case face each other.

12. The battery pack of claim 11, wherein one of the first and second couplers includes a first side that is convex shaped and protrudes in the second direction, and wherein the other of the first and second couplers includes a second side that is concave shaped and is recessed in the second direction so as to be connected to the first side.

13. The battery pack of claim 11, wherein the first coupler is placed on exterior surfaces of at least one of the cell holders and extends in the second direction, and wherein the second coupler is placed on exterior surfaces of the case.

14. The battery pack of claim 11, wherein the first and second couplers are placed on either front or rear side with respect to the first direction.

15. The battery pack of claim 14, further comprising a plurality of bus bars extending in the first direction so as to electrically connect different ones of the battery assemblies, wherein the different battery assemblies electrically connected by the bus bars are connected in parallel and have the same polarity or are connected in series and have different polarities.

16. The battery pack of claim 1, wherein the BMS is positioned on an exterior surface of the second case.

17. A battery pack comprising:
a case having a first side and a second side longer than the first side, the case accommodating a plurality of battery assemblies which extend in a first direction in which the second side of the case extends;
a battery management system (BMS) having a first side and a second side longer than the first side, the BMS being configured to control a charging/discharging operation of the battery cells, wherein the BMS is placed on a single exterior surface of the case and extends in the first direction in which the second side of the BMS extends; and
a plurality of lead wires interconnecting the battery assemblies and the BMS,
wherein the case has a plurality of openings that expose the lead wires to the environment, wherein the openings are formed on an exterior surface of the case,
wherein the case comprises a first case and a second case configured to be assembled in a second direction crossing the first direction,
wherein the openings comprise a plurality of first openings formed in the first case and a plurality of second openings formed in the second case, and wherein the first and second openings are aligned in the second direction when the first and second cases are assembled.

18. The battery pack of claim 17, wherein each of the battery assemblies comprises a plurality of battery cells each extending in a second direction crossing the first direction.

19. The battery pack of claim 18, wherein the first and second directions are substantially perpendicular to each other.

20. The battery pack of claim 17, wherein the BMS has a substantially rectangular shape having a pair of long sides and a pair of short sides, and wherein the long sides of the BMS extend in the first direction.

21. The battery pack of claim 17, further comprising a plurality of bus bars connecting the battery assemblies and extending in the first direction.

* * * * *